No. 893,906. PATENTED JULY 21, 1908.
F. V. DRAKE.
ROPE CARRIER.
APPLICATION FILED JULY 24, 1907.
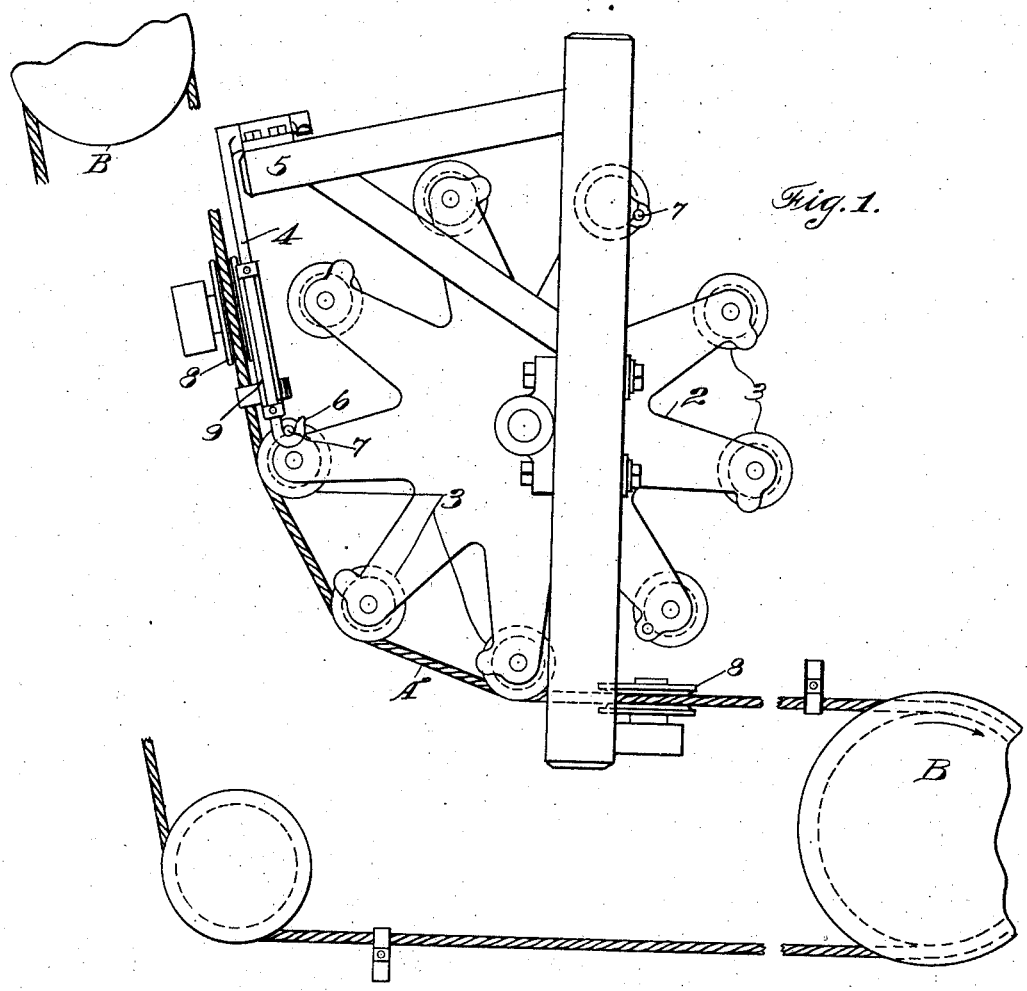
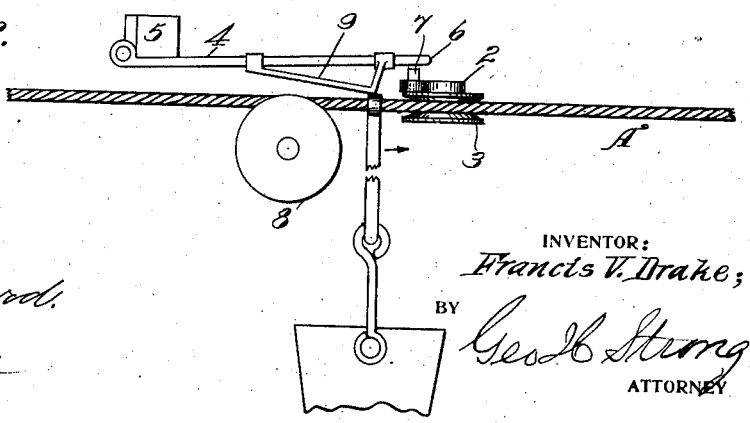
WITNESSES
INVENTOR:
Francis V. Drake;
BY
ATTORNEY

UNITED STATES PATENT OFFICE.

FRANCIS V. DRAKE, OF BISHOP, CALIFORNIA.

ROPE-CARRIER.

No. 893,906.  Specification of Letters Patent.  Patented July 21, 1908.

Application filed July 24, 1907. Serial No. 385,264.

*To all whom it may concern:*

Be it known that I, FRANCIS V. DRAKE, citizen of the United States, residing at Bishop, in the county of Inyo and State of California, have invented new and useful Improvements in Rope-Carriers, of which the following is a specification.

My invention relates to a means for changing the direction of endless, traveling rope carriers, and means for allowing the bucket, or other hangers suspended from the rope, to pass the inside pulley or drum around which the change of direction is effected.

It consists in the combination and arrangement of parts, and in details of construction, which will be more fully explained by reference to the accompanying drawings, in which—

Figure 1 is a plan view of the device. Fig. 2 is a side view of the releasing mechanism.

In the transportation of ore in mining regions, and for other equivalent transportation, it is customary to employ an endless traveling cable, either with grips attached thereto, and hangers depending from the grips, from which hangers the load is suspended, or the load may be similarly carried upon a stationary cable, and propelled by a supplemental traveling cable. Such apparatus is easily operated, where the direction is in a substantially straight line, since the hangers projecting outwardly from the pulleys around which the rope passes will always carry their loads around the outside of the pulleys without obstruction; but when having passed around the terminal pulley the carriers are to be returned, the hangers will project inwardly, and would thus not pass properly around the pulleys by which the change of direction is made in the return portion.

A represents a rope or cable, which passes around pulleys B—B at each end of its line of travel; and when such pulleys are so located with relation to each other that it is not possible for the rope to pass in a straight line between them, it is necessary that the direction of travel be changed around an intermediate device. Such a device is here shown in the form of a centrally journaled and turnable wheel 2. This wheel is here shown in the form of a star having numerous points, and at the end of each point is journaled a grooved pulley 3. The wheel and pulleys may be revoluble in a horizontal position, or at such an angle as the direction of travel of the rope requires. The pulleys may be mounted upon balls, or roller bearings, so as to revolve freely, and require the least amount of lubrication and attention; and in the change of direction the rope may change its travel at any angle from an obtuse to an acute one, thus coming in contact with a plurality of the pulleys 3.

The wheel 2 is normally locked in position by means of an arm 4 having one end loosely fixed to a support, as at 5, and the other end provided with a hook or equivalent stop 6. Each of the projecting points of the wheel 2 may have a pin or equivalent stop 7, projecting in such a manner that the hook or catch 6 will normally engage with the stop, and thus arrest the wheel 2 and hold it stationary while the rope continues to travel freely around the pulleys 3.

Upon each side of the wheel 2, and where the rope approaches it tangentially, are horizontal journaled rollers 8 which serve to support and guide the rope so that it will properly engage with the pulleys 3.

9 is an inclined wedge, cam, or other shaped device, which may either be carried by the stop arm 4, or in other suitable manner, in such a way that when a load approaches, some portion of the load carrier will contact with this incline, and thus push the hook or catch 6 out of engagement with the stop 7. This releases the wheel 2; and as the load arrives at this point the wheel will also turn in unison with the movement of the rope, until the load has passed around that portion of the wheel through which the change of direction is effected. Then when the load again starts off and leaves the wheel on a substantially tangential line, the catch is allowed to again engage with one of the stops 7 and the rotation of the wheel will be arrested, the rollers turning in unison with the movement of the traveling rope. I have found that this intermittent movement of the wheel which carries the pulleys where the rope is traveling continuously around the latter, is an effective and superior method of making the desired change of direction, and it will be manifest that the hangers, when they reach the wheel, are not compelled to pass over direction pulleys which are stationary; but that the rope hangers and wheel move in unison during this change of direction.

Having thus described my invention, what I claim and desire to secure by Letters Patent is—

1. In an apparatus for transferring loads and changing the direction of travel, an endless traveling rope, a normally stationary wheel with peripheral pulleys over which the rope is guided, and means for intermittently releasing the wheel to revolve in unison with the travel of the rope, said means including a vertically tiltable lever fulcrumed contiguous to the rope near the wheel, having a hook upon its free end, pins upon the wheel arms with which the hook engages, a load carrier fixed to the rope and adapted to contact with the lever, and disengage it from the engaged pin.

2. A journaled and normally stationary wheel, with independently revoluble peripheral pulleys, an endless traveling load-propelling rope, the direction of travel of which is changed around the wheel, and means for releasing the wheel to make partial revolutions in unison with the travel of the rope, said means including a pivoted lever having an inclined lower surface, and a hook at its free end, pins upon the ends of the wheel arm with which the hook engages, a load carrier fixed to the rope and adapted to contact with the incline and lift it to disengage the hook when a load approaches the wheel.

In testimony whereof I have hereunto set my hand in presence of two subscribing witnesses.

FRANCIS V. DRAKE.

Witnesses:
GEO. H. STRONG,
FRANK L. OWEN.